(12) United States Patent
Sagalowicz et al.

(10) Patent No.: US 8,920,862 B2
(45) Date of Patent: Dec. 30, 2014

(54) MAILLARD FLAVOR COMPOSITIONS AND METHODS FOR MAKING SUCH COMPOSTIONS

(75) Inventors: Laurent Sagalowicz, Blonay (CH); Tomas Davidek, Correvon (CH); Florian Viton, Lausanne (CH); Haiqing Yu, Ellisville, MO (US); Martin Leser, Dublin, OH (US)

(73) Assignee: Nestec SA, Vevey (CH)

( * ) Notice: Subject to any disclaimer, the term of this patent is extended or adjusted under 35 U.S.C. 154(b) by 266 days.

(21) Appl. No.: 12/737,247

(22) PCT Filed: Jun. 22, 2009

(86) PCT No.: PCT/US2009/003711
§ 371 (c)(1),
(2), (4) Date: Apr. 15, 2011

(87) PCT Pub. No.: WO2010/008452
PCT Pub. Date: Jan. 21, 2010

(65) Prior Publication Data
US 2011/0189367 A1    Aug. 4, 2011

Related U.S. Application Data

(60) Provisional application No. 61/132,976, filed on Jun. 24, 2008.

(51) Int. Cl.
| | | |
|---|---|---|
| A23L 1/22 | (2006.01) |
| A23L 2/56 | (2006.01) |
| A23D 7/00 | (2006.01) |
| A23D 9/00 | (2006.01) |
| A23B 7/157 | (2006.01) |
| A23L 1/27 | (2006.01) |
| C12C 5/04 | (2006.01) |
| C12C 3/08 | (2006.01) |
| C12C 3/12 | (2006.01) |
| C12C 7/00 | (2006.01) |
| C12C 7/14 | (2006.01) |
| A23D 7/01 | (2006.01) |
| A23D 7/005 | (2006.01) |
| A23K 1/16 | (2006.01) |
| A23K 1/18 | (2006.01) |
| A23L 1/227 | (2006.01) |

(52) U.S. Cl.
CPC .............. *A23D 7/011* (2013.01); *A23D 7/0053* (2013.01); *A23K 1/164* (2013.01); *A23K 1/1646* (2013.01); *A23K 1/1846* (2013.01); *A23L 1/2275* (2013.01)
USPC ........... 426/533; 426/602; 426/262; 426/540; 426/422; 426/534

(58) Field of Classification Search
USPC ......................................... 426/533
See application file for complete search history.

(56) References Cited

U.S. PATENT DOCUMENTS 4,171,381 A * 10/1979 Chiu .............................. 426/105
4,968,522 A * 11/1990 Steinke et al. ................ 426/602
(Continued)

OTHER PUBLICATIONS

Filippone., "Roux Gravy". Available online at http://homecooking.about.com on Nov. 17, 2007.*

(Continued)

*Primary Examiner* — Rena L Dye
*Assistant Examiner* — Assaf Zilbering
(74) *Attorney, Agent, or Firm* — Julie M. Lappin; Ronald A. Burchett

(57) ABSTRACT

The invention provides methods for making Maillard flavor compositions in a structured lipid phase using Maillard reactants, e.g., reducing sugars and amino groups. The structured lipid phase comprises from about 0.3% to about 95% aqueous solvent and from about 5% to about 99.7% lipid plus emulsifier. The compositions are useful for enhancing the palatability of foods, dietary supplements, medicaments, and the like.

5 Claims, 3 Drawing Sheets

(56) References Cited

U.S. PATENT DOCUMENTS 5,043,173 A * 8/1991 Steinke et al. .................. 426/94
6,562,391 B1 * 5/2003 Vauthey et al. ............... 426/533
2006/0003061 A1 * 1/2006 Boston et al. ................. 426/268

OTHER PUBLICATIONS

"Flavored Butters". Available online at www.foodnetwork.com on Feb. 6, 2006.*

* cited by examiner

MAILLARD FLAVOR COMPOSITIONS AND METHODS FOR MAKING SUCH COMPOSTIONS

CROSS REFERENCE TO RELATED APPLICATIONS

This application is a national stage application under 35 U.S.C. §371 of PCT/US2009/003711 filed Jun. 22, 2009, which claims priority to U.S. Provisional Application Ser. No. 61/132,976, filed Jun. 24, 2008, the disclosures of which are incorporated herein by reference.

BACKGROUND OF THE INVENTION

1. Field of the Invention

The invention relates generally to flavor compositions and methods for making flavor compositions and particularly to Maillard flavor compositions, methods for making Maillard compositions, and their use for enhancing palatability of comestible compositions.

2. Description of the Related Art

It is well-known that many flavors, colors, and aromas associated with cooking processes result from nonenzymatic, or nonenzymic, browning. Generally, nonenzymic browning comprises pyrolysis, carmelization, and Maillard reactions. Of these, the Maillard reaction may be the most significant. Discovered in 1912, the Maillard reaction is actually a group of complex chemical reactions between available carbonyl groups and available amino groups. In food systems, reducing groups can be found on reducing sugars and amino groups can be found on free amino acids, peptides, and proteins. Initially, a reactive carbonyl group of a reducing sugar condenses with a free amino group, with a concomitant loss of a water molecule. The resultant N-substituted glycoaldosylamine is not stable. The aldosylamine compound rearranges, through an Amadori rearrangement, to form a ketosamine. Ketosamines that are so-formed may further react through any of the following three pathways: (a) further dehydration to form reductones and dehydroreductones; (b) hydrolytic fission to form short chain products, such as diacetyl, acetol, pyruvaldehyde, and the like, which can, in turn, undergo Strecker degradation with additional amino groups to form aldehydes, and condensation, to form aldols; and (c) loss of water molecules, followed by reaction with additional amino groups and water, followed by condensation and/or polymerization into melanoids. Factors that affect the rate and/or extent of Maillard reactions include among others the temperature, water activity ($A_w$), and pH. The Maillard reaction is enhanced by high temperature, low moisture levels (e.g., Aw from about 0.6 to about 0.7), and alkaline pH. The skilled artisan will appreciate that Maillard reactions are thus very complex and a great variety of reaction products can be generated. At each stage of the Maillard reaction, and under specified conditions, the reaction may generate compounds that contribute to the palatability of a food or to a unique flavor profile associated with that food cooked in a particular way.

Emulsions in food systems are also well known. Both oil-in-water (e.g., salad dressings, milk) and water-in-oil (e.g., butter, margarine) emulsions are common. WO9962357 discloses emulsions used for various purposes in the food industry, including delivery of flavor compositions. US20080038428 proposes using emulsions with an aqueous continuous phase as a means of conducting Maillard reactions. WO2007060177 discloses an oil-in-water emulsion wherein the oil droplets are structured using emulsifiers that can be useful for performing a Maillard reaction. WO200033671 discloses processes for producing Maillard reaction aroma products in an emulsifier and water mixture. However, no oil is used and the processes result in a product that is solid at temperatures lower than 80° C., which makes the product very difficult to handle and introduce into food products. These systems are useful but inefficient for conducting Maillard reactions and delivering Maillard compositions useful for enhancing palatability. There is, therefore, a need for new and efficient methods for producing Maillard reaction products and Maillard compositions that are useful for enhancing palatability.

SUMMARY OF THE INVENTION

It is, therefore, an object of the present invention to provide Maillard flavor compositions useful for enhancing palatability.

It is another object of the invention to provide Maillard flavor compositions that can be easily introduced into food and petfood products.

It is another object of the invention to provide methods for making Maillard flavor compositions useful for enhancing palatability.

It is another object of the invention to provide foods, dietary supplements, medicaments, or other comestible materials comprising at least one Maillard flavor composition.

It is a further object of the invention to provide compositions and methods for enhancing palatability of foods, dietary supplements, medicaments, or other comestible materials.

It is another object of the invention to provide comestible compositions that contain one or more structured lipid phases that produce Maillard reaction products during preparation, e.g., when heated.

One or more of these and other objects are achieved using novel Maillard flavor compositions that enhance palatability of foods, dietary supplements, medicaments, or other comestible materials. The compositions comprise a structured lipid phase comprising a continuous lipid phase comprising a lipid and a dispersed aqueous phase comprising an aqueous solvent. The aqueous phase contains at least a first reactant having a free carbonyl group and a second reactant having an amino group available for reaction with the free carbonyl on the first reactant. Upon incubation under suitable conditions, a Maillard reaction occurs between the first reactant and the second reactant. This reaction produces at least one Maillard reaction product. These Maillard flavor compositions are useful for enhancing the palatability of products to an animal, e.g., food compositions.

These and other and further objects, features, and advantages of the present invention will be readily apparent to those skilled in the art.

DETAILED DESCRIPTION OF THE INVENTION

Definitions

Figure 1:
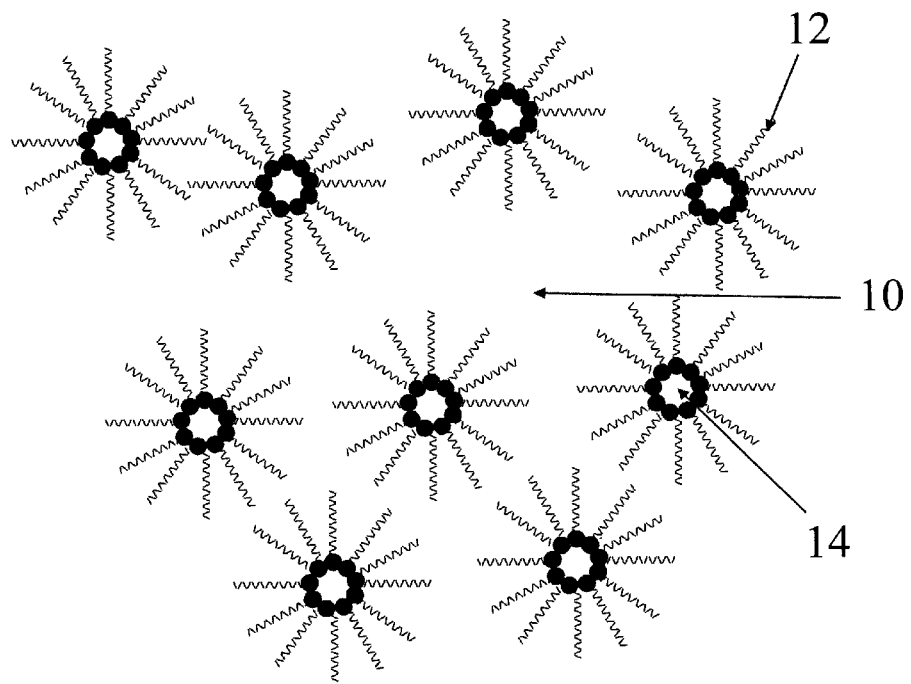
FIG. 1 illustrates a water-in-oil microemulsion. The continuous phase is an oil wherein the typical size of the water or aqueous domain is between 0.5 and 100 nm and an emulsifier is used to obtain this structure. The "emulsifier" can be a single emulsifier or a combination of emulsifiers.

The term "structured lipid" or "structured lipid phase" means a water-in-lipid dispersion comprising a continuous lipid phase made of oil, with optional lipohilic additives, and a dispersed aqueous phase featuring water domains that are dispersed, emulsified, or microemulsified within the lipidic phase. Preferred embodiments of the structured lipid further comprise one or more lipophilic additives (also called emulsifiers) that emulsify or stabilize the structured lipid phase by reducing the surface tension between the continuous and dispersed phases. Structured lipids may be present alone or coexist with a product, excess water, or an excess of any other food constituent. An "excess of water" is any water that is not solubilized or dispersed and therefore forming domains having a diameter larger than 1 micron, preferably larger than 10 microns, and even more preferably larger than 100 microns. Structured lipids encompass lipids with or without art-recognized structures such as water-in-oil emulsions, water-in-oil microemulsions, reversed microemulsions, liquid crystalline structures (e.g., reversed micellar cubic, reversed bicontinuous cubic, or reversed hexagonal structures), lamellar liquid crystalline structures, sponge phases (L3) or the like, or any combinations thereof. A reversed structure is defined as a structure in which the stabilizing film is curved towards water. Preferred structured lipids include reversed water-in-oil microemulsions, water-in-oil structures or emulsions, or combinations thereof. Reversed microemulsions are preferably of the L2 or bicontinuous type. Preferred water-in-oil reversed microemulsions show a phase separation when diluted with water, and dilution with water or with an aqueous phase results in a two phase or in a multi-phase system: reversed microemulsion plus water or aqueous phase or other phases. The structured lipid includes any structure that has the characteristic of a water-in-oil emulsion, water-in-oil microemulsion, reversed microemulsion, liquid crystalline structure (e.g., reversed micellar cubic, reversed bicontinuous cubic, or reversed hexagonal structures), lamellar liquid crystalline structure, sponge phase (L3) or the like, or any combinations thereof at storage temperatures or at temperatures at which the Maillard reaction occurs or at any temperatures between storage temperatures and temperatures at which the Maillard reaction occurs.

The term "lipophilic additive" or "emulsifier" means a compound or composition that comprises one or more molecules, compounds, or ingredients for emulsifying or stabilizing a water-in-oil emulsion or a water-in-oil microemulsion. The lipophilic additive or emulsifier can also be defined using its hydrophilic-hydrophobic balance (HLB). Suitable emulsifiers or emulsifier mixtures have a HLB lower than 8, preferably lower than 7. Emulsifiers include monoglycerides, including saturated and unsaturated monoglycerides, diglycerides, phospholipids, lecithins, polyglycerol esters of fatty acids, propylene glycerol esters of fatty acids, polyglycerol polyricinoleates, stearoyl lactylates, sorbitan esters of fatty acids, derivatives of the foregoing, salts of the foregoing, particularly sodium and/or calcium salts, or any combinations the foregoing. Also useful as emulsifiers are mono- or di- glyceride esters of fatty acids, for example, esters of tartaric acid, acetic acid, citric acid, lactic acid, sorbic acid, or other edible, food-grade, or food-compatible acids, monoglyceride phosphates, and other derivatives or salts of mono- or diglycerides. Other useful lipophilic additives (emulsifier) are long-chain alcohols, fatty acids, pegylated fatty acids, glycerol fatty acid esters, derivatives of mono-diglycerides, pegylated vegetable oils, sorbitan esters, polyoxyethylene sorbitan esters, propylene glycol mono- or diesters, phosphatides, cerebrosides, gangliosides, cephalins, lipids, glycolipids, sulfatides, sugar esters, sugar ethers, sucrose esters, sterols, polyglycerol esters, myristic acid, oleic acid, lauric acid, stearic acid, palmitic acid, PEG 1-4 stearate, PEG 2-4 oleate, PEG-4 dilaurate, PEG-4 dioleate, PEG-4 distearate, PEG-6 dioleate, PEG-6 distearate, PEG-8-dioleate, PEG-3-16 castor oil, PEG 5-10 hydrogenated castor oil, PEG 6-20 corn oil, PEG 6-20 almond oil, PEG-6 olive oil, PEG-6 peanut oil, PEG-6 palm kernel oil, PEG-6 hydrogenated palm kernel oil, PEG-4 capric/caprylic triglyceride, mono, di, tri, tetraesters of vegetable oil and sorbitol, pentaerythrityl di, tetra stearate, isostearate, oleate, caprylate or caprate, polyglyceryl-3 dioleate, stearate, or isostearate, polyglyceryl 4-10 pentaoleate, polyglyceryl 2-4 oleate, stearate, or isostearate, polyglyceryl 4-10 pentaoleate, polyglyceryl-3 dioleate, polyglyceryl-6 dioleate, polyglyceryl-10 trioleate, polyglyceryl-3 distearate propylene glycol mono- or diesters of C6 to C20 fatty acid, monoglycerides of C6 to C20 fatty acid, lactic acid derivatives of monoglycerides, lactic acid derivatives of diglycerides, diacetyl tartaric ester of monoglycerides, triglycerol monostearate cholesterol, phytosterol, PEG 5-20 soya sterol, PEG-6 sorbitan tetra, hexasterarate, PEG-6 sorbitan tetraoleate, sorbitan monolaurate, sorbitan monopalmitate, sorbitan mono trioleate, sorbitan mono and tristearate, sorbitan monoisostearate, sorbitan sesquioleate, sorbitan sesquistearate, PEG-2-5 oleyl ether, POE 2-4 lauryl ether, PEG-2 cetyl ether, PEG-2 stearyl ether, sucrose distearate, sucrose dipalmitate, ethyl oleate, isopropyl myristate, isopropyl palmitate, ethyl linoleate, isopropyl linoleate, poloxamers, phospholipids, lecithins, cephalins, oat lipids and lipophilic amphiphilic lipids from other plants; and mixtures thereof. Other molecules or combination of molecules are possible as long as they provide water-in-oil emulsion, water-in-oil microemulsion, or combination of both. Examples of commercial products that may be useful as emulsifiers herein include Dimodan® Distilled Monoglycerides, Panodan® DATEM (Diacetyl Tartaric Acid Esters), Grindsted™ ACETEM (Acetic Acid Esters of Monoglycerides), Grindsted™ CITREM (Citric Acid Esters of Monoglycerides), Grindsted™ LACTEM (Lactic Acid Esters of Monoglycerides), Grindsted™ Mono-Di (Mono and Diglycerides), Grindsted™ PGE or PGPR (Polyglycerol Esters of Fatty Acids, Polyglycerol Polyricinoleate), Grindsted™ PGMS (Propylene Glycerol Esters of Fatty Acids), and Grindsted™ SMS or STS (Sorbitan Monostearate, Sorbitan Tristearate) (all, Danisco, Denmark). In some embodiments, one or more proteins with emulsifying properties may also be useful as emulsifiers, alone, or more preferably, in combination with any other emulsifier or combination thereof. Presently preferred emulsifiers comprise saturated or unsaturated monoglycerides, lecithins, phospholipids, or any combination thereof.

The term "microemulsion" means an immiscible lipid-aqueous system in which a dispersed phase is dispersed within a continuous phase and wherein the droplets, domains, or channels of the dispersed phase are of an average nominal size on the order of less than about 300 nm in diameter. More preferably they average 100 nm, 80 nm, 50 nm, or less. In one embodiment, the microemulsion contains micelles, droplets, domains, or channels that range in size from about 0.5 to about 300 nm. In other embodiments, the aqueous phase ranges in size from 2 to about 200 nm, or 10 to 100 nm. Microemulsions are generally thermodynamically stable and can be clear or nearly clear. When an immiscible lipid-aqueous system has been prepared so as to form a microemulsion, it is sometimes referred to herein as "microemulsified." Presently preferred structure lipids encompass microemulsions having an L2 structure. In a preferred embodiment, the water droplet size is about 100 times smaller than in a normal water-in-oil emulsion. In standard microemulsions, the dispersed phase droplets are known as "micelles."

A normal or standard "emulsion" refers to an immiscible lipid-aqueous system where a dispersed phase is dispersed within a continuous phase, and wherein the dispersed phase includes droplets, domains, or channels of nominal size larger than about 250 nm in diameter, or in some embodiments, larger than 300 nm to about 1 µm. These emulsions are generally thermodynamically unstable and at least slightly turbid. The immiscible phases will generally separate given time, depending on temperature and other factors. The skilled artisan will appreciate that many emulsions contain at least some droplets, domains, or channels of less than 200, 100, 50, or even 10 nm. Emulsions are nonetheless generally differentiated from microemulsions, which exclude such large droplets, domains and channels. When an immiscible lipid-aqueous system has been prepared so as to form an emulsion, it is sometimes referred to herein as "emulsified." The term "emulsion" also means emulsions like oil-in-water-in-oil double emulsion.

The term "water-in-oil" emulsion or microemulsion means that the continuous phase is lipid and the dispersed phase is aqueous. The skilled artisan will appreciate that emulsions and microemulsions may be solid, semi-solid or liquid. As used herein, an aqueous dispersed phase can comprise any manner, variety, or combination of micelles, droplets, domains, or channels. The aqueous phase can comprise any aqueous solvent, and any solutes or combination of solutes may be dissolved therein to the limit of their solubility, including reducing reactants, amino reactants, catalysts, salts, buffers, acids, and the like. In preferred embodiments, the aqueous phase is predominantly water having one or more reducing sugars and amino acids or proteins dissolved therein. In other embodiments, the aqueous phase contains phosphate-containing or carboxylate-containing compounds, such as salts, acids, or buffers. Such compounds are useful for adjusting the pH, buffering against pH changes, and catalyzing Maillard reactions.

The term "reducing reactant" means a reactant that comprises a reactive aldehyde (—CHO) or keto (—CO—) group, e.g., a reactant with a free or available carbonyl group, such that the carbonyl group is available to react with an amino group on a reactant in a Maillard reaction. In preferred embodiments, the reducing reactant is a reducing sugar, e.g., a sugar that can reduce a test reagent, e.g., can reduce $Cu^{2+}$ to $Cu^+$, or can be oxidized by such reagents. Monosaccharides, disaccharides, oligosaccharides, polysaccharides (e.g., dextrins, starches, and edible gums) and their hydrolysis products are suitable reducing reactants if they have at least one reducing group that can participate in a Maillard reaction. Reducing sugars include aldoses or ketoses such as glucose, fructose, maltose, lactose, glyceraldehyde, dihydroxyacetone, arabinose, xylose, ribose, mannose, erythrose, threose, and galactose. Other reducing reactants include uronic acids (e.g., glucuronic acid and galacturonic acid) or Maillard reaction intermediates bearing at least one carbonyl group such as aldehydes, ketones, alpha-hydroxycarbonyl or dicarbonyl compounds.

The term "amino reactant" means a reactant having a free amino group that is available to react with a reducing reactant in a Maillard reaction. Amino reactants include amino acids, peptides (including dipeptides, tripeptides, and oligopeptides), proteins, proteolytic or nonenzymatic digests thereof, and other compounds that react with reducing sugars and similar compounds in a Maillard reaction. In some embodiments, the amino reactant also provides one or more sulfur-containing groups.

The term "Maillard reaction product" means any compound produced by a Maillard reaction. In preferred embodiments, the Maillard reaction product is a compound that provides flavor ("Maillard flavor"), color ("Maillard color"), or a combination thereof. The term "flavor" includes "odor" and "taste."

The term "Maillard flavor composition" means a composition comprising a structured lipid, a first reducing reactant, a second amino reactant, and any Maillard reaction products produced by a Maillard reaction between the first and second reactants.

The term "animal" means any animal that could benefit from enhanced palatability resulting from Maillard compositions, including human, avian, bovine, canine, equine, feline, hicrine, lupine, murine, ovine, or porcine animals.

The term "companion animal" means domesticated animals such as cats, dogs, rabbits, guinea pigs, ferrets, hamsters, mice, gerbils, horses, cows, goats, sheep, donkeys, pigs, and the like.

The term "palatability" refer to a quality of a food, food supplement, food additive, dietary supplement, medicament, or the like, that makes it appealing or pleasing to one or more of an animal's senses, particularly the senses of taste and smell. Accordingly, palatability is determined subjectively. As used herein, whenever an animal shows a preference for one of two or more foods, the preferred food has greater or enhanced palatability. For companion animals and other non-human species, the relative palatability of one food compared to one or more other foods can be determined, for example, in side-by-side, free-choice comparisons, e.g., by relative consumption of the foods, or other appropriate measures of preference indicative of palatability. The skilled artisan will appreciate that various aspects or phases of "palatability" can be considered both independently and interdependently. For example, "initial appeal," "continued consumption palatability," and "repeated presentation palatability" can all be considered. "Initial appeal" is an aspect of palatability that induces an animal to initially taste or try a food, dietary supplement, or medicament. "Continued consumption palatability' is an aspect of palatability that induces an animal to continue consuming a product that has been initially only tasted or tried. "Repeated presentation palatability" or "repeated feeding palatability" is an aspect of palatability evident when a food composition, dietary supplement, or medicament, which has previously been both tasted and consumed, is presented repeatedly to the animal for consumption over time. For example, a complete and nutritionally-balanced food composition that is fed daily to an animal will hopefully provide palatability for each repeated presentation of feeding, such that the animal continues to consume adequate quantities of the food.

The term "palatability enhancer" means any compound, composition, formulation, or other material useful for enhancing the palatability of a comestible composition such as a food composition, supplement, medicament, or the like.

Palatability enhancers enhance palatability at any one or more of the aspects of palatability. Thus, such palatability enhancers may contribute to initial appeal, continued consumption, or repeated presentation aspects of palatability, or any combination thereof. Examples of palatability enhancers include fats (e.g., tallow), flavors, aromas, extracts, digests, and the like.

The term "animal digest" means a material that results from chemical and/or enzymatic hydrolysis of clean, undecomposed animal tissue. In certain embodiments, "animal digest" as used herein, is fully consistent with the definition of animal digest promulgated by the Association of American Feed Control Officials, Inc. (AAFCO). Animal digest is preferably derived from animal tissues, including cold-blooded marine animals, excluding hair, horns, teeth, hooves, and feathers. The skilled artisan will appreciate that while such tissues are not preferred, trace amounts might be found unavoidably even under good manufacturing practices. Also not included are visceral contents or foreign or fecal matter, although trace contaminant amounts are sometimes present. When an animal digest is dried, it may be referred to as "dried animal digest." Animal digests in accordance herewith are suitable for use in food or feed compositions. Specifically included are (1) Digest of Beef (or Poultry, Pork, Lamb, Fish, etc): material from beef (poultry, pork, etc.) which results from chemical and/or enzymatic hydrolysis of clean and undecomposed tissue; (2) Digest of Beef (or Pork, Lamb, etc) By-Products: material from beef (poultry, pork, etc.) which results from chemical and/or enzymatic hydrolysis of clean and undecomposed tissue from non-rendered clean parts from cattle (pigs, lambs, fish, etc), other than meat, for example lungs, spleen, kidneys, brain, livers, blood, bone, partially-defatted low-temperature fatty tissue, and stomachs and intestines, freed of their contents; and (3) Digest of Poultry By-Products: material which results from chemical and/or enzymatic hydrolysis of clean and undecomposed tissue from non-rendered clean parts of carcasses of slaughtered poultry such as heads, feet, and viscera. As used herein "poultry" encompasses any species or kind of bird, preferably chicken, turkey, duck, or other food species.

The term "effective amount" means an amount of a compound, material, composition, medicament, or other material that is effective to achieve a particular desired result. Such results include, but are not limited to, one or more of the following: (a) enhancing palatability; (b) inducing an animal to consume more of a particular food or other material than the animal otherwise would, in either a single feeding or over the course of multiple feedings; or (c) inducing an animal to consume a medicament or a food or dietary supplement that the animal might not otherwise voluntarily consume.

The term "food" or "food composition" means a product or composition that is intended for ingestion by an animal, including a human, and provides at least one nutrient or comestible ingredient to the animal. The term "food" includes any food, feed, snack, food supplement, treat, meal substitute, or meal replacement, whether intended for a human or another animal. "Food" encompasses such products in any form, solids, liquids, gels, or mixtures or combinations thereof. Thus, beverages of any type are clearly encompassed within the term "food." The skilled artisan will appreciate that the ingredients or components of a food composition are comestible or edible by an animal in the normal course, and such ingredients or components do not include compounds that are toxic or otherwise deleterious to health in the amounts used in the food composition.

The term "pet food" or "pet food composition" or the like, means a composition intended for consumption by a non-human animal, preferably by a companion animal. Nutritionally-balanced pet food compositions are widely known and used in the art.

A "nutritionally-complete," "nutritionally-balanced," or "complete and nutritionally-balanced" food is one that contains all known required nutrients for the intended recipient or consumer of the food, in appropriate amounts and proportions, based, for example, on recommendations of recognized or competent authorities in the field of companion animal nutrition. Such foods are therefore capable of serving as a sole source of dietary intake to maintain life or promote production, without the addition of supplemental nutritional sources. The terms include any food, feed, snack, food supplement, treat, meal substitute, or meal replacement, whether intended for a human or another animal, in any form, including solids, liquids, gels and the like. Such foods, when intended for companion animals, are frequently in the form of extruded pet foods, such as kibble-type foods for dogs and/or cats.

The term "dietary supplement" means a product that is intended to be ingested in addition to the normal animal diet. Dietary supplements may be in any form, e.g., solid, liquid, gel, tablets, capsules, powder, and the like. Preferably they are provided in convenient dosage forms. In some embodiments, dietary supplements are provided in bulk consumer packages such as bulk powders, liquids, gels, or oils. In other embodiments, supplements are provided in bulk quantities to be included in other food items such as snacks, treats, supplement bars, beverages, and the like.

The term "in conjunction" in certain contexts means that a Maillard flavor composition, e.g., for enhancing palatability of a food composition or the like, and that food composition or the like whose palatability is to be enhanced, are administered to an animal (1) together in a food composition, or the like (e.g., dietary supplement, or medicament), or (2) separately, at the same or different frequency, using the same or different administration routes, at about the same time, or periodically. "Periodically" means that the Maillard flavor composition is administered on a dosage schedule acceptable for that specific palatability enhancer and that the food, dietary supplement, or medicament, is provided to an animal routinely as appropriate for the particular animal. "About the same time" generally means that the food, dietary supplement, or medicament, and the Maillard flavor composition are administered at the same time or within about 72 hours of each other. "In conjunction" specifically includes administration schemes wherein a palatability enhancer is administered for a predetermined, prescribed, or desired period, and the compositions disclosed herein are administered within a defined window of time before, during, or after providing the food, dietary supplement, or medicament whose palatability is to be enhanced, the window being between from about 0 to about 240 minutes before the start of, and after the completion of, e.g., the animal's normal feeding time, supplement time, or medicament administration time.

The term "single package" means that the components of a kit are physically associated, in or with one or more containers, and considered a unit for manufacture, distribution, sale, or use. Containers include, but are not limited to, bags, boxes or cartons, bottles, packages of any type or design or material, over-wrap, shrink-wrap, affixed components (e.g., stapled, adhered, or the like), or combinations thereof. A single package may be containers of individual Maillard flavor compositions and comestible compositions, e.g., food ingredients or food compositions, physically associated such that they are considered a unit for manufacture, distribution, sale, or use.

The term "virtual package" means that the components of a kit are associated by directions on one or more physical or virtual kit components instructing the user how to obtain the other components, e.g., in a bag or other container containing one component and directions instructing the user to go to a website, contact a recorded message or a fax-back service, view a visual message, or contact a caregiver or instructor to obtain instructions on how to use the kit, or safety or technical information about one or more components of a kit. Examples of information that can be provided as part of a virtual kit include instructions for use; safety information such as material safety data sheets; poison control information; information on potential adverse reactions; clinical study results; dietary information such as food composition or caloric composition; general information on improving palatability in the diet, or Maillard reaction products for such us, or increasing appetite in an animal in need thereof; health consequences stemming from a decrease in nutrient intake, or from inadequate nutrient intake; or general information on nutrition or providing optimal nutrition; self-help relating to nutrition and appetite; caregiver information for those caring for animals with nutritional challenges, and diseases that result in decreased body weight, wasting, or the like, or other loss of appetite challenges; improving acceptance of orally-administered dietary supplements or medicaments, and use, benefits, and potential side-effects or counter-indications, if any, for the compositions described herein, e.g., palatability enhancers.

All percentages expressed herein are by weight of the total composition, including any water content ("wet weight"), unless indicated otherwise.

As used throughout, ranges herein are stated in shorthand, so as to avoid having to set out at length and describe each and every value within the range. Any appropriate value within the range can be selected, where appropriate, as the upper value, lower value, or the terminus of the range. For example, a range of 0.1 to 1.0 represents the terminal values of 0.1 and 1.0 and the intermediate values of 0.2, 0.3, 0.4, 0.5, 0.6, 0.7, 0.8, 0.9, and all intermediate ranges encompassed within 0.1 to 1.0, such as 0.2 to 0.5, 0.2 to 0.8, 0.7 to 1.0, and so on.

As used herein and in the appended claims, the singular form of a word includes the plural, and vice versa, unless the context clearly dictates otherwise. Thus, the references "a", "an", and "the" are generally inclusive of the plurals of the respective terms. For example, reference to "a palatability enhancer", "a method", or "a food" includes a plurality of such "palatability enhancers", "methods", or "foods." Reference herein, for example to "an antioxidant" includes a plurality of such antioxidants, whereas reference to "pieces" includes a single piece. Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Where used herein the term "examples," particularly when followed by a listing of terms is merely exemplary and illustrative, and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to and does not limit the scope of that which is disclosed or claimed.

The Invention

In one aspect, the invention provides methods for making Maillard flavor compositions suitable for enhancing the palatability of foods, dietary supplements, medicaments, or other comestible materials. The methods comprise (a) making a structured lipid phase comprising a continuous lipid phase comprising a lipid and a dispersed aqueous phase comprising an aqueous solvent, wherein the aqueous phase contains at least a first reactant having a free carbonyl group, and a second reactant having an amino group available for reaction with the free carbonyl on the first reactant; and (b) incubating the structured lipid phase under conditions of time and temperature sufficient for a Maillard reaction to occur between the first and second reactants, such that at least one Maillard reaction product is formed. The Maillard flavor compositions comprise one or more Maillard reaction products, including Maillard flavors, Maillard colors, and Maillard aromas. The Maillard reaction products are generally produced in structured lipids, e.g., water-in-oil emulsions or water-in-oil microemulsions.

The emulsions and microemulsions comprise a structured lipid phase having a continuous lipid phase and a dispersed aqueous phase. The aqueous phase contains at least a first reactant having a free carbonyl group, and a second reactant having an amino group available for reaction with the free carbonyl on the first reactant, such that, upon incubating the structured lipid phase at a suitable temperature for a suitable time, a Maillard reaction occurs between the first and second reactants, and at least one Maillard reaction product is formed. The invention also provides the Maillard flavor compositions produced using these methods.

Without being bound by theory, it appears that the Maillard reaction that occurs within the structured lipid occurs within the micelles, dispersed droplets, domains, and/or channels of the dispersed aqueous phase. The water-soluble reactants are concentrated in the aqueous phase, and perhaps with the interfacial areas between the continuous and dispersed phases of the structured lipid phase, e.g., water-in-oil emulsions and microemulsions. The first, or reducing reactant, the second, or amino reactant, and other Maillard reactants are water-soluble and cannot migrate out of the micelles, aqueous domains, droplets, and/or channels of the dispersed aqueous phase. In prior Maillard reaction systems, including bulk aqueous reactions and reactions in emulsions with an aqueous continuous phase, the hydrophilic reactants (e.g., sugars and amino acids) are dispersed and not restricted or concentrated in the micelles, droplets, and/or channels. In the present invention, the hydrophilic reactants do not migrate out of the aqueous domains into the oil; they remain concentrated in the hydrophilic micelles, droplets, and/or channels. This keeps their concentration relatively high and therefore increases the Maillard reaction rate. Further, many reaction products resulting from the Maillard reaction are hydrophobic. In prior systems, the reaction products accumulate and gradually shift the equilibrium away from product formation. This decreases the reaction rate or decreases the extent of conversion of reactant to product. In the present invention, the hydrophobic Maillard reaction products migrate out of the micelle into the continuous lipid phase (e.g., oil). This migration removes the Maillard reaction products from the micelles, droplets, and/or channels and shifts the equilibrium of the Maillard reaction to product formation. This results in an increase in the reaction rate and ultimately the extent of the conversion from reactants to products, i.e., the production of Maillard reaction products and Maillard compositions. Thus, by conducting the reaction according to the disclosed methods, the reactants remain concentrated within the hydrophilic micelles, droplets, domains, and/or channels while the hydrophobic reaction products migrate out into the lipophilic environment of the continuous lipid phase.

The resultant shift in equilibrium increases both the reaction rate and the amount of Maillard reactants converted to Maillard reaction products. Surprisingly, and quite unexpectedly, almost all of the Maillard reactants are converted to Maillard reaction products (e.g., see Examples for amounts in excess of 98%). In contrast, in prior art systems, Maillard reactants are converted to Maillard reaction products in amounts of less than 50%, typically in the range of 10% to 30%.

In addition to increasing the amount of Maillard reactants converted to Maillard reaction products, the Maillard reaction products produced by the methods of the invention have a different flavor profile and different concentrations as compared to control reactions conducted in water, normal oil-in-water emulsions, structured oil-in-water emulsions, other bulk aqueous phase systems, or other reported Maillard reaction environments. Also, the Maillard reactions products and compositions obtained herein are easier to make, more economical to make, easier to store, easier to maintain, easier to use, and easier to introduce in products, particularly foods and related compositions.

In various embodiments, the structured lipid phase comprises from about 0.1% to about 99.7% lipid and from about 0.3% to about 95% aqueous phase. The skilled artisan will appreciate that the structured lipid phase can comprise any relative proportions of lipid to aqueous phase provided that the structured lipid phase can be prepared, e.g., as a water-in-oil emulsion or microemulsion. In preferred embodiments of the structured lipid phase, the lipid is an oil or fat. In various embodiments, the structured lipid phase comprises from about 0.5% to about 99.5% lipid, preferably from about 1% to about 99.5% lipid, more preferably from about 5% to about 95% lipid, and from about 0.5% to about 90% aqueous phase, preferably from about 1% to about 85% aqueous phase, more preferably from about 1% to about 80% aqueous phase.

Oil is used in the broad sense. An oil can be liquid, solid (fat), crystallized, or amorphous at room temperature. Possible oils for making the structured lipid are mineral oils, hydrocarbons, vegetable oils, animal oils, waxes, alcohols, fatty acids, mono-, di-, tri-acylglycerols, essential oils, flavoring oils, lipophilic vitamins, esters, nutraceuticals, terpins, terpenes and mixtures thereof. Possible oils for making the structured lipids also comprise oils, such as those described above, which have been partially hydrolyzed. These oils may be hydrolyzed by any suitable hydrolysis procedure, such as alkaline hydrolysis, steam stripping or enzymatic hydrolysis.

In one embodiment, the first reactant is a reducing reactant such as an aldose, ketose, uronic acid, or Maillard reaction intermediates bearing at least one carbonyl group, particularly a monosaccharide, a disaccharide, an oligosaccharide, a polysaccharide, or their hydrolysis products, provided that it has at least one reducing group. The saccharide can have any number of carbon atoms, and thus may be a triose, a tetrose, a pentose, a hexose, a heptose, and so on, or any combination thereof. In preferred embodiments, the first reactant is a reducing sugar. Preferred reducing sugars for use herein are glucose, fructose, mannose, maltose, lactose, xylose, arabinose, or any combination thereof. Preferred reducing sugars are readily-available reducing sugars that are food-derived, or generally regarded as safe (GRAS) ingredients.

The second reactant is any amino reactant with an available amino group that can participate in a Maillard reaction. In preferred embodiments, the second reactant is an amino acid, peptide, hydrolyzed protein, polypeptide, or any combination thereof.

Figure 2:
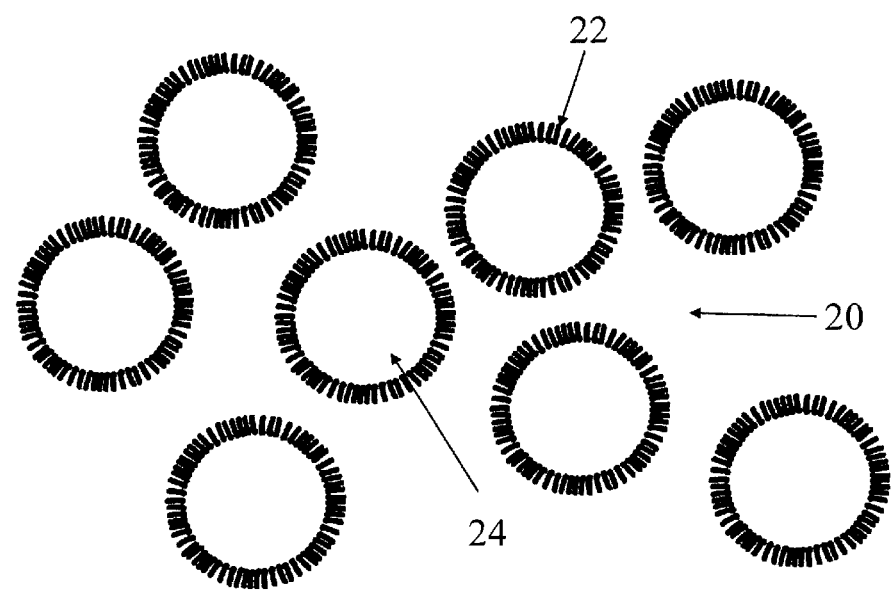
FIG. 2 illustrates a water-in-oil emulsion. The continuous phase is an oil wherein the typical size of the water or aqueous domain is between 50 nm and 1 mm and an emulsifier might be used to obtain this structure. The "emulsifier" can be a single emulsifier or a combination of emulsifiers.
Figure 3:
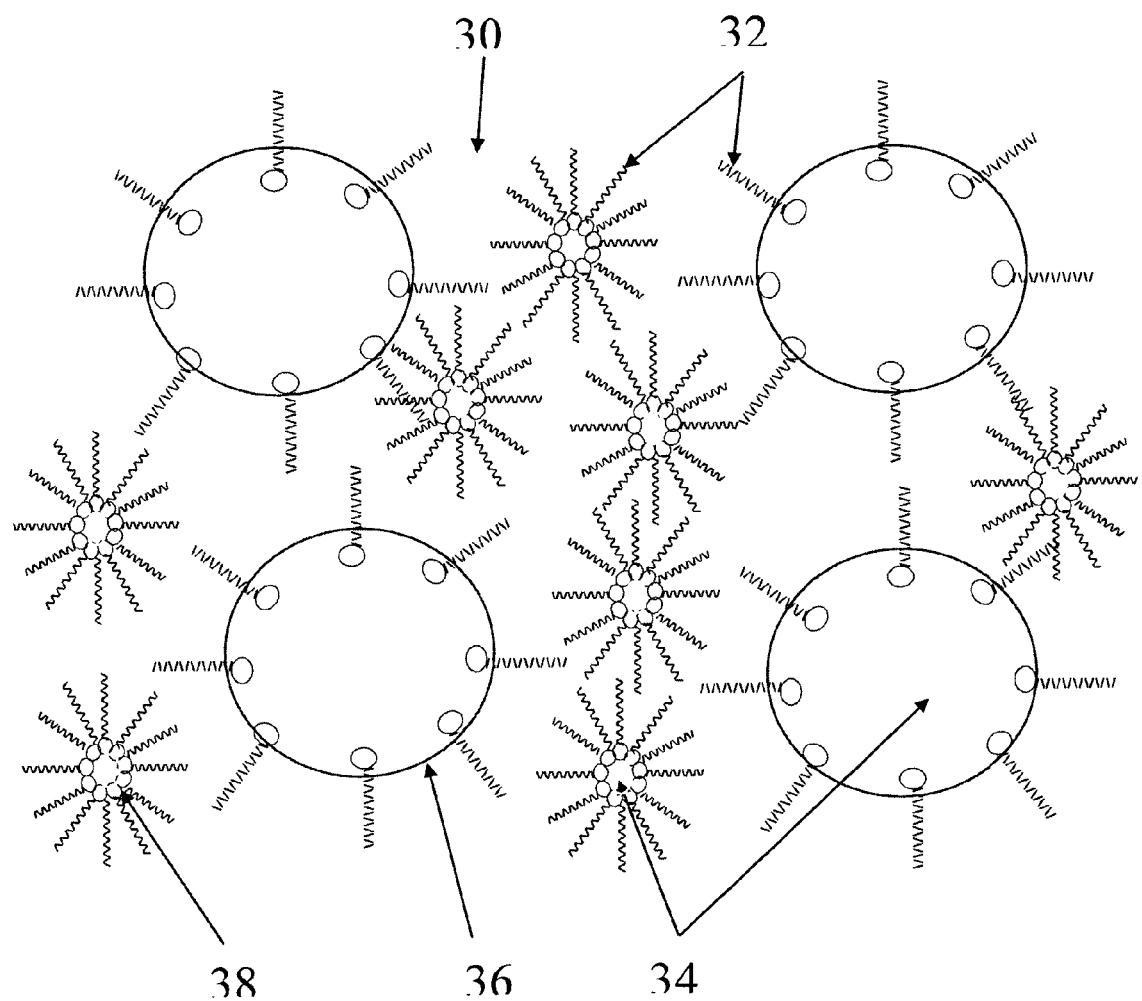
FIG. 3 illustrates a mixture between a water-in-oil emulsion and a water-in-oil microemulsion. The microemulsion comprises water-in-oil emulsion droplets and water-in-oil microemulsion droplets. The two types of droplets define aqueous domains that are surrounded by emulsifiers. The "emulsifier" can be a single emulsifier or a combination of emulsifiers. The size of the water or aqueous domains is typically the size of a water-in-oil emulsion droplet or of an oil-in-water microemulsion droplet.

In the method, the step of making the structured lipid phase comprises mixing the lipid and the aqueous solvent to generate a structured lipid phase wherein the mixing step is sufficient to form a water-in-oil emulsion such as the emulsion shown in FIG. 2, a water-in-oil microemulsion such as the emulsion shown in FIG. 1, or other structured lipid phase such as a mixture between a water-in-oil emulsion and a water-in-oil microemulsion shown in FIG. 3. Mixing as used herein is a very broad term intended to encompass any act of combining the lipid and aqueous phases into the form of an emulsion or microemulsion. The skilled artisan has available a large number of methods, and devices for forming structured lipid phases. Any such methods or devices known in the art for forming an emulsion or microemulsion are useful herein. In some embodiments, the microemulsion may be a fully- or partially-self-assembling microemulsion.

Referring to FIG. 1, a water-in-oil microemulsion comprises an oil 10, an emulsifier 12, and an aqueous domain 14. Generally, the size of the water or aqueous domain is between 0.5 and 100 nanometers, typically about 10 nanometers. Referring to FIG. 2, a water-in-oil emulsion comprises an oil 20, an emulsifier 22, and an aqueous domain 24. Generally, the size of the water or aqueous domain is between 50 nanometers and about 1 millimeter, typically about 10 micrometers. Referring to FIG. 3, a mixture between a water-in-oil emulsion and a water-in-oil microemulsion comprises an oil 30, an emulsifier 32, an aqueous domain 34, a water-in-oil microemulsion droplet 36, and a water-in-oil emulsion droplet 38. Generally, the size of the water or aqueous domains is typically the size of a water-in-oil emulsion droplet or of an oil-in-water microemulsion droplet as described in FIG. 1 and FIG. 2.

The Maillard reactants tend to be water-soluble. Therefore, the water soluble reactants are dissolved or dispersed within the aqueous phase before the mixing step. In one embodiment, at least the first and second reactants are dissolved in the aqueous solvent before the mixing. In other embodiments, additional water-soluble compounds are dissolved in the aqueous solvent. Such compounds may include additional Maillard reactants, catalysts, buffers, compounds for adjusting pH such as acids, buffers, or salts, emulsifiers, and stabilizers. In various embodiments, the aqueous solvent comprises from about 0.001% to about 50% reducing reactants, about 0.001% to about 50% amino reactants, and from about 0.001% to about 50% other solutes or additives.

The step of making the structured lipid phase generally comprises adding one or more emulsifiers before or during the mixing step. The emulsifiers are useful for emulsifying or stabilizing, or both, the structured lipid phase. In one presently preferred embodiment, the emulsifiers have a hydrophilic lipophilic balance (HLB) of less than about 8, preferably less than 7.

The structured lipid phase comprises from about 0.1% to about 99.6% emulsifier. The emulsifier can comprise any one or more emulsifying compounds, and preferably, the emulsifier is suitable for use in a food system, or as a food additive, or is GRAS. In presently preferred embodiments, the emulsifier is a monoglyceride, a diglyceride, a polyglycerol ester, or a phospholipid, a lecithin, or any combination thereof. The emulsifier can encompass a saturated or unsaturated molecule, such as mono- or di-glycerides.

The lipid phase preferably comprises a lipid derived from a plant or animal that is an edible or comestible lipid. The lipid comprises beef tallow, lamb tallow, lard, poultry fat, chicken fat, soy oil, sunflower oil, palm oil, cotton seed oil, rapeseed oil, coconut oil, corn oil, canola oil, olive oil, or any combination thereof in various embodiments. In some embodiments, the lipid phase comprises lipids such as those described above that have been partially hydrolyzed. These lipids may be hydrolyzed by any suitable hydrolysis procedure, such as alkaline hydrolysis, steam stripping, or enzymatic hydrolysis. It will be appreciated that the hydrolyzed lipid phase produced by these processes is unlikely to be completely hydrolyzed in that amounts of mono-, di- and/or triglycerides will be present in the hydrolyzed lipid phase. If desired, these glycerides may be removed by conventional separation techniques, but this is not necessary.

In certain embodiments, the method comprises a further step of adding at least a portion of the structured lipid to at least one comestible ingredient, food composition, dietary supplement, medicament, or other material. The adding step is conducted before, during, or after the incubating step, or a combination thereof. In one embodiment, the adding step is conducted before the incubation step, or before the conclusion of the incubation. In such embodiments, the incubation step is conducted at least in part, in conjunction with a further step of processing the comestible ingredient, food composition, dietary supplement, or medicament. The skilled artisan will recognize that in such embodiments, at least a portion of the Maillard reaction products will be formed in situ in, e.g., the food. In other embodiments, the incubation step is conducted, and thus further Maillard reaction products form, at least in part, during storage, or during shipment of the comestible ingredient, food composition, dietary supplement, or medicament.

In other embodiments, the adding step is conducted prior to the incubating step, and preferably the incubating step is conducted, at least in part, in conjunction with a thermal process applied to the food composition, dietary supplement, or medicament. Any type or kind of thermal process used the arts of food processing or pharmaceutical processing may be useful for the methods herein. Preferred thermal process comprises extrusion, retorting, baking, or pasteurization.

In other embodiments, the adding step comprises adding at least one additional composition that provides or enhances palatability of the comestible ingredient, food composition, dietary supplement, medicament, or other material. The skilled artisan will appreciate that many compounds useful for enhancing palatability are known in the art, and all are suitable for use herein. Exemplary compounds include flavors, aromas, and the like, as well as fats or oils, sweeteners, salt, and the like. In one embodiment, the additional palatability enhancer is an animal digest.

As discussed above, the method can be conducted in a variety of manners to produce the structure lipid phase. In one embodiment, the making step comprises dissolving at least the first and second reactants in the aqueous solvent; mixing the aqueous solvent with one or more lipids and one or more emulsifiers; and forming a water-in-oil emulsion or microemulsion therebetween. Energy input in the form of mixing, agitating, emulsifying, blending, micronizing, and the like is preferably used in the making step.

The incubating step comprises allowing the reactants to interact at any temperature conductive for conducting a Maillard reaction, e.g., room temperature or lower depending on the reactants. In preferred embodiments, incubating step comprises heating to a temperature of from about 60° C. to about 180° C. In various embodiments, the temperatures for incubating or heating are from about 80° C. to 150° C., or preferably, the temperatures are from about 90° C. to 120° C. The time for the incubating step is from about 1 minute to about 12 hours. Preferably, the incubation time is from about 1 minute to about 640 minutes. Other preferred times for incubation are from about 5 minutes to about 300 minutes, preferably from about 10 minutes to about 180 minutes. For both temperature and time, the only firm requirements are that the time and temperature combination are sufficient for a Maillard reaction to occur within the water-in-oil system. In some systems, the Maillard reaction occurs during a retorting process. Because of the effective concentration of reactants within micelles, droplets, domains, and channels, and potentially at the interfaces between the continuous and dispersed phases, the required times and temperature may differ substantially from those required in bulk aqueous Maillard reactions, or even other complex food systems. Accordingly, the time and temperature for the nonenzymic reactions can be readily determined by observing or measuring an increase in reaction product(s) or a decrease in reactants. Incubation temperatures can be obtained using any suitable heating method such as microwave heating or can be obtained in any suitable process such as baking or retorting.

In some embodiments, the aqueous solvent further comprises one or more of a catalyst suitable for enhancing the rate of Maillard reactions, or a compound for adjusting the pH of the aqueous solvent. The catalyst preferably comprises a compound having a phosphate or a carboxylate group, or other known Maillard reaction catalyst or enhancer.

In various embodiments, the structured lipid phase comprises more than 0.3% water, more than 0.1% lipid, and more than 0.1% emulsifier, wherein the lipid is an oil or fat. Preferably, the structured lipid phase comprises from about 0.5% to about 25% water, and from about 75% to about 99.5% lipid plus emulsifier ("lipid plus emulsifier" means the content of lipid phase plus the content of the emulsifier). As above, the HLB of the emulsifier is less than about 8, preferably less than about 7.

The skilled artisan will appreciate the emulsions and microemulsions feature micelles, droplets, domain, channels of varied size and varied average size as defined herein. In one preferred embodiment, the average size of the water droplets, domains, or channels is about 50 nm.

The methods for making the Maillard flavor compositions have proven to provide enhanced conversions of Maillard reactants into Maillard reaction products, including Maillard flavors and Maillard colors. In one embodiment, the methods provide a conversion of Maillard reactants into Maillard reaction products in the structured lipid phase that exceeds the conversion of Maillard reactants into Maillard reaction products in a control Maillard reaction conducted under the same conditions with the same reactants in an aqueous system, e.g., a "bulk-phase" aqueous reaction. In one embodiment, the conversion of Maillard reactants is at least 10% greater than the conversion in the control reaction resulting in an enhanced formation of Maillard reaction products, particularly in some key compounds like furfuryl thiol (FFT) or methyl furyl thiol (MFT). In another, the conversion of Maillard reactants is at least 50% higher than in the control reaction. In yet other embodiments, the reaction is nearly complete, providing a conversion of reactants of at least 80, 85, 90, 95%, or more.

In another aspect, the invention provides products made using the methods of the invention.

In another aspect, the invention provides Maillard flavor compositions comprising a structured lipid phase and at least one Maillard reaction product. The structure lipid phase comprises any amounts or proportions of lipid, emulsifier, and aqueous solvent that can form a water-in-oil emulsion or microemulsion. Preferably, the structured lipid phase comprises from about 0.3% to about 95% aqueous solvent and from about 5% to about 99.7% lipid plus emulsifier. More preferably, the structured lipid phase comprises from about 0.5% to about 75% aqueous solvent, most preferably from about 0.5 to about 25%. Preferably, the emulsifier has a HLB less than 8 and the lipid comprises a comestible oil or fat. The Maillard reaction product is produced within and is within the structured lipid phase.

The Maillard flavor compositions are produced by the methods of the invention. In one embodiment the Maillard flavor composition is produced by a method comprising (a) making a structured lipid phase comprising a continuous lipid phase comprising a lipid, and a dispersed aqueous phase comprising an aqueous solvent, wherein the aqueous phase contains at least a first reactant the reactant having a free carbonyl group, and a second reactant having an amino group available for reaction with the free carbonyl on the first reactant; and (b) incubating the structured lipid phase under conditions of time and temperature sufficient for a Maillard reaction to occur between the first and second reactants, such that at least one Maillard reaction product is formed.

In one preferred embodiment, the structured lipid phase is a microemulsion. The microemulsion can exist at suitable temperature. Preferably, microemulsion has a temperature lower than 50° C., more preferably lower than 40° C. The emulsifier comprises a saturated or unsaturated monoglyceride in certain embodiments. The composition can further comprise at least one catalyst of a Maillard reaction, at least one additional palatability enhancer, or both.

In another aspect, the invention provides comestible compositions comprising at least one comestible ingredient and at least one Maillard flavor composition. In preferred embodiments, the comestible composition comprises from about 0.001% to about 50% Maillard flavor composition. Preferably, the comestible composition is a food, dietary supplement, medicament, or other comestible material, most preferably a food composition.

In other embodiments, the comestible composition further comprises at least one additional palatability enhancer such as an animal digest. Preferably, the comestible composition with the added Maillard flavor composition has measurably enhanced palatability compared to a control comestible composition that does not contain the Maillard flavor composition. In some embodiments, the comestible composition is preferred by at least a factor of 10% more than the control comestible composition. It other embodiments, an improvement of 20, 30, 40, or 50% is observed. In other embodiments, the comestible composition is preferred up to 2:1, 3:1 or more over the control comestible composition. In one embodiment, the comestible composition is a food composition. In another, the food composition is formulated as an animal food such as a pet food or companion animal food.

In another aspect, the invention provides methods for enhancing palatability of a comestible composition. The methods comprise adding to a comestible composition at least one Maillard flavor composition in an amount effective for enhancing palatability of the comestible composition compared to a control that does not have the Maillard flavor composition added. The amount of Maillard flavor composition added is preferably from about 0.001% to about 50% of the comestible composition. The invention also provides the comestible compositions produced using these methods.

In another aspect, the invention provides food compositions comprising at least one comestible ingredient and a water-in-oil emulsion, microemulsion, or another reversed structured phase comprising a continuous lipid phase comprising a comestible fat or oil and a dispersed aqueous phase comprising an aqueous solvent. The aqueous solvent has dissolved therein at least a comestible reducing reactant having a free carbonyl, and a comestible second reactant containing an amino group, and an emulsifier having an HLB less than 8. The reducing reactant and the second reactant can undergo a Maillard reaction to form at least one Maillard reaction product under suitable conditions. Preferably, the emulsion or microemulsion comprises from about 0.3% to about 95% aqueous solvent and from about 5% to about 99.7% lipid plus emulsifier. More preferably, the structured lipid phase comprises from about 0.5% to about 75% aqueous solvent, most preferably from about 0.5 to about 25%. Preferred emulsifiers include saturated and unsaturated monoglycerides.

In one embodiment, the food composition has been subjected to a thermal processing step or storage conditions under which at least one Maillard reaction product is formed from the reducing reactant and the second reactant. Any thermal processing step above ambient temperature at which a Maillard reaction product can form is useful herein. The food composition is a pet food composition in one embodiment. In presently preferred embodiments, the composition comprises at least one additional palatability enhancer.

In another aspect, the invention provides comestible compositions comprising (1) one or more comestible ingredients and (2) one or more structured lipids comprising a continuous lipid phase comprising a lipid and a dispersed aqueous phase comprising an aqueous solvent, wherein the aqueous phase contains at least a first reactant having a free carbonyl group, and a second reactant having an amino group available for reaction with the free carbonyl on the first reactant.

The comestible ingredients are any comestible ingredients compatible with the structured lipids. Preferably, the comestible ingredients are ones that require or are made more palatable by heating, e.g., by warming or by cooking.

The comestible compositions are made by combining one or more comestible ingredients with one or more structured lipids. The compositions can be stored or otherwise retained until needed, e.g., for consumption or for further preparation and subsequent consumption.

These compositions can be consumed as made but are preferably heated before consumption. When consumed as made, the first and second reactants react to produce Maillard reaction products that increase the palatability of the comestible compositions. Although the reaction occurs, it is generally slower than optimal. When heated, the compositions are heated to temperatures useful to prepare the comestible ingredients for consumption, generally by cooking or otherwise heating the compositions. Upon heating, the first and second reactants react to produce one or more Maillard reaction products. Heating facilitates the reaction process and produces more Maillard reaction products than would not have been produced without heating. Such Maillard reaction products increase the palatability of the comestible compositions, particularly when produced in amounts made by heating.

Any temperature suitable for preparing the comestible compositions and for causing a Maillard reaction is suitable. Typically, the compositions are heated to temperatures of from about 60° C. to about 400° C. In various embodiments, the compositions are heated to temperatures of from about 60° C. to 350° C., 300° C., 250° C., 233° C., or 220° C. In other embodiments the compositions are heated to temperatures of from about 70° C. to 180° C., from about 80° C. to 120° C., or from about 80° C. to 100° C. Heating the compositions containing the structured lipids causes the first and second reactants react and form Maillard reaction products that increase the palatability of the compositions. The comestible compositions can be heated by any suitable means. Typically, the compositions are baked or cooked in an oven; heated on a stove or by a fire, e.g., in a pan, pot, or other suitable container; steam heated; or heated using a microwave oven.

The first and second reactants can be any such reactant compatible with the comestible ingredients in the composition. In various embodiments, the first and second reactants are (1) one or more reducing sugars and one or more amino acids or (2) one or more reducing sugars and one or more proteins.

In preferred embodiments, the structured lipids are mixed with the comestible ingredients, topically applied to the comestible ingredients, added onto or into preferred locations or sections in or on the ingredients, or otherwise distributed evenly or unevenly in or on the ingredients.

In one embodiment, food compositions that will be heated for serving, e.g., a product to be baked, comprise the product ingredients and one or more one or more structured lipids. The product is placed in an oven and heated to a temperature suitable for baking the product. As the product bakes, the heat induces a reaction involving the first and second reactants. The reaction produces Maillard reaction products that enhance the palatability of the comestible composition.

In preferred embodiments, the comestible compositions are food compositions suitable for consumption by an animal, more preferably food compositions suitable for consumption by a companion animal, most preferably food compositions suitable for consumption by pets. In an embodiment, the comestible composition is a pet food suitable for warming in a microwave oven. The pet food is heated sufficiently to produce Maillard reaction products in the food and served to the pet.

In another aspect, the invention provides compositions made by heating comestible compositions comprising (1) one or more comestible ingredients and (2) one or more structured lipids comprising a continuous lipid phase comprising a lipid and a dispersed aqueous phase comprising an aqueous solvent, wherein the aqueous phase contains at least a first reactant having a free carbonyl group, and a second reactant having an amino group available for reaction with the free carbonyl on the first reactant. The compositions have an enhanced palatability due to the presence of Maillard reaction products resulting from heating the compositions as described herein.

In another aspect, the invention provides kits suitable for enhancing palatability of a comestible composition. The kits comprise in separate containers in a single package or in separate containers in a virtual package, as appropriate for the kit component, one or more Maillard flavor composition and one or more of (1) one or more ingredients suitable for consumption by an animal, (2) one or more palatability enhancers, (3) instructions for combining kit components to produce a composition useful for enhancing palatability of a food composition, (4) instructions for using Maillard reaction products, Maillard flavor compositions, or other components of the kit for the benefit of the animal, (5) a vessel for preparing or combining the kit components to produce a composition for administration to an animal, such as bowl, container, bag, or the like, (6) a means for admixing one or more kit components, such as a spoon, a spatula, or other suitable utensil, or (7) a means for administering combined or prepared kit components to an animal, such as a bowl, a spoon, a bottle, a cup, or the like.

In one embodiment, the Maillard flavor composition comprises at least one Maillard reaction product and a structured lipid phase comprising, for example, at least 0.1% aqueous solvent, and at least 50% lipid plus emulsifier. Preferably, the emulsifier has a HLB less than 8, and the lipid is a comestible oil or fat. In preferred embodiments, the Maillard reaction product is produced within the structured lipid phase.

Other kits provided herein include kits suitable for enhancing palatability of a food composition comprising, in separate containers in a single package, or in separate containers in a virtual package, a water-in-oil emulsion or microemulsion comprising a continuous lipid phase comprising a comestible fat or oil and a dispersed aqueous phase comprising an aqueous solvent having dissolved therein at least a comestible reducing reactant having a free carbonyl, and a comestible second reactant containing an amino group, and an emulsifier. Preferably, the emulsifier has an HLB less than 8. The reducing reactant and the second reactant can preferably undergo a Maillard reaction to form at least one Maillard reaction product under suitable conditions. The emulsion or microemulsion, in preferred embodiments, comprises from about 0.5% to about 25% aqueous solvent, and from about 75% to about 99.5% lipid plus emulsifier. The kits further comprise one or more of (1) one or more ingredients suitable for consumption by an animal, (2) one or more palatability enhancers, (3) instructions for combining kit components to produce a composition useful for enhancing palatability of a food composition, (4) instructions on applying a thermal processing step to combined or uncombined kit components to produce one or more Maillard reaction products (5) instructions for using Maillard reaction products, Maillard flavor compositions, and other components of the kit for the benefit of the animal, (6) a vessel for preparing or combining the kit components to produce a composition for administration to an animal, such as a bowl, container, bag, box or the like, (7) a means for admixing one or more kit components, such as a spoon, spatula, or other utensil, or (8) a means for administering combined or prepared kit components to an animal, such as a plate, bowl, spoon, bottle, glass, or the like.

In a further aspect, the invention provides means for communicating information about, or instruction for use of, a Maillard flavor composition comprising at least one Maillard reaction product and a structured lipid phase comprising at least 0.1% aqueous solvent, and at least 50% lipid plus emulsifier; wherein the emulsifier has a HLB less than 8, the lipid comprising a comestible oil or fat, wherein the Maillard reaction product is produced within the structured lipid phase, wherein the information is about, or the instructions are for, one or more of: (1) instructions for administering the composition to an animal in conjunction with at least one comestible ingredient; (2) instructions for one or more methods of using the composition for enhancing palatability of a food composition; (3) information on providing proper nutrition, including the use of the composition, to an animal in need of foods having enhanced palatability, or an animal having a diminished appetite due to a disease or other health condition; (4) information about palatability and appetite; (5) information regarding physical, cellular and biochemical results of undernutrition, conditions causing loss of appetite, or wasting diseases, or recovery from, or prevention or treatment of the same, or (6) comparative information or test results regarding the composition, or regarding the palatability of food compositions to which it is added.

In various embodiments, the means of communicating comprises a physical or electronic document, digital storage media, optical storage media, audio presentation, audiovisual display, or visual display containing the information or instructions. The means can be a displayed web site, visual display kiosk, brochure, product label, package insert, advertisement, handout, public announcement, audiotape, videotape, DVD, CD-ROM, computer readable chip, computer readable card, computer readable disk, USB device, FireWire device, computer memory, or any combination thereof.

In another aspect, the invention provides packages comprising a Maillard flavor composition generally comprising at least one Maillard reaction product and a structured lipid phase comprising at least 0.1% aqueous solvent, and at least 50% lipid plus emulsifier; wherein the emulsifier has a HLB less than 8, the lipid comprising a comestible oil or fat, wherein the Maillard reaction product is produced within the structured lipid phase. The package contains a word or words, picture, design, logo, graphic, symbol, acronym, slogan, phrase, or other device, or combination thereof, either directly on the package or on a label affixed thereto, indicating that the composition is useful for enhancing palatability of a food composition. In one embodiment, the Maillard flavor composition in the package is a component of a comestible composition. In another, the Maillard flavor composition in the package is a component of a food composition.

EXAMPLES

The invention can be further illustrated by the following examples, although it will be understood that the examples are included merely for purposes of illustration and is not intended to limit the scope of the invention unless otherwise specifically indicated.

Materials and Methods

Examples 1 to 8

The following method ("Method 1") was used to prepare the compositions used in some of the Examples. Reducing sugars, amino acids, catalysts (where used), and acids or bases (where used) were added to water and agitated until dissolved, resulting in an aqueous solution. Without adjusting the pH, the aqueous solution was mixed with fat or oil and lipophilic additives. The resulting mixture was agitated at 500 to 3000 rpm, for 1 to 5 minutes, to generate a water-in-oil emulsion comprising a continuous structured lipid phase, having dispersed water phase featuring water domains that are emulsified or microemulsified within the lipidic phase. Such water-in-oil emulsions are referred to herein as "structured lipid phase."

To promote the Maillard reaction, the structured lipid phase was heated to about 85° C. to 180° C. for 5 to 180 minutes. Agitation was continued during heating. The temperature was then lowered to about 45° C. to 60° C., with agitation to ensure homogenous cooling.

Method 1 produces a flavor composition (a "Maillard flavor composition") containing Maillard reaction products, e.g., Maillard flavors. The Maillard flavor composition is stored at 10° C. to 60° C. until use.

When preparing a food composition using a Maillard flavor compositions prepared according to Method 1, the Maillard flavor composition can be conveniently added to a fat or oil that is sprayed onto, or added to the food composition in amounts of from about 0.001% to about 9%, by weight, based on total food composition. When used with other flavors, the other flavors, including flavors prepared by using hydrolytic enzymes to clean animal tissue, including liver and/or viscera, e.g., animal digests, can be added to or applied to the food composition.

The following method ("Method 2") was used to prepare the compositions used in some of the Examples. The steps of Method 1 were repeated except that the pH was adjusted to 5.5 before mixing the aqueous solution with fat or oil and lipophilic additives. Maillard flavor compositions prepared according to Method 2 are added to a fat or oil that is sprayed onto or added into the food composition in amounts of from about 0.001% to about 9% by weight based on total food composition. When used with other flavors, the other flavors were added to or applied onto the food composition.

The following method ("Method 3") was used to prepare the compositions used in some of the Examples. The steps of Method 1 were repeated except that the pH was adjusted to 7.5 before mixing the aqueous solution with fat or oil and lipophilic additives. When preparing a food composition using a Maillard flavor compositions prepared according to Method 3, the Maillard flavor composition was added to a fat or oil that was sprayed onto or added to the food composition in amounts of from about 0.001% to about 30%, by weight based on total food composition. When used with other flavors, the other flavors were added to or applied to the food composition.

Example 1

Materials: The following materials were used D-Xylose, Biochemica Fluka (Buchs, CH); Glycine, Biochemica Fluka (Buchs, CH); Dimodan U Danisco (Copenhagen, DK); Soybean oil Nutriswiss (Lyss, Switzerland); Monosodium dihydrogenphosphate, monohydrate, p.A. Merck (Dietikon, CH); and Water Milli Qa-10, Millipore (FR).

Analysis: The analysis of residual xylose was performed by HPAEC, as follow. Xylose was analyzed by HPAEC using a Dionex ion chromatography system (DX500, Dionex, Sunnyvale, Calif.) composed of an autosampler (model AS-50 with a 10 µL sample loop), a gradient pump (model GP-50) with on-line degas and an electrochemical detector (model ED-40). The separation was accomplished on a 250 mm×2 mm i.d. CarboPac PA-1 anion exchange column (Dionex) and a 50 mm×2 mm i.d. CarboPac PA-1 guard column (Dionex). The analyses were performed isocratically using a solvent mixture (92:8, v/v) water and NaOH (300 mmol/L). Each analytical cycle was followed by cleaning and regeneration of the column with NaOH (300 mmol/L) for 15 min and equilibration of the column with an initial isocratic conditions for 10 min. The flow rate was 0.25 mL/min. To increase the sensibility, the column eluent was mixed with NaOH (300 mmol/L; 0.3 mL/min) prior detection. Xylose (RT=15 min) was quantified with an electrochemical detector equipped with a gold working electrode. The electrode pulse potentials were as follows: E1=0.1V, 0-400 ms; E2=-2.0V, 410-420 ms; E3=0.6V, 430 ms; E4=-0.1V; 440-500 ms. Quantification was based on a calibration curve by comparing the peak areas with those of standard solutions containing known amounts of pure compound. Each sample was injected twice. The solutions and eluents were prepared using ultrapure deionized water (specific resistivity g 18.2 MΩ cm) from a Milli-Q-system (Millipore, Bedford, Mass.). NaOH solutions used as eluents were prepared by diluting a carbonate free 50-52% (w/w) NaOH solution in water previously degassed with helium gas.

A first Maillard flavor composition was made using Method 1. Glycine and xylose were used as reactants for the Maillard reaction. To make the first composition, a solution containing 2.43 g xylose, 1.215 g glycine and 6.355 g phosphate buffer (0.2 mol/L; pH 6) was prepared. An aliquot of the solution (0.09 g), Dimodan U (0.54 g) and soy bean oil (0.27 g) were placed into a Pyrex tube and the tube was heated in a water bath at 40° C. When the temperature of the sample reached 40° C., the tube was agitated with a vortex to homogenize the phase and then cooled down to room temperature. A water-in-oil microemulsion was obtained. The sample was placed in a silicone bath at 120° C. and heated for 30 minutes. After cooling down, diethyl ether (10 mL) was added to the water-in-oil microemulsion and the mixture was shaken during 45 min to disintegrate the water-in-oil microemulsion. Then water (20 mL) was added and the mixture was shaken during 30 min. Finally, the mixture was centrifuged at 4000 rpm for 20 min to separate water and organic phase. The water phase was filtered through a PVDF filter (polyvinylidene fluoride, 0.22 μm/25 mm) and analysed by high performance anion exchange chromatography (HPAEC). This is a composition of the present invention.

A second Maillard flavor composition was made using the methods disclosed in WO27060177A1, also using glycine and xylose as reactants. To make the second composition, a solution containing 2.43 g xylose, 1.215 g glycine and 6.355 g phosphate buffer (0.2 mol/L; pH 6) was prepared. An aliquot of the solution (0.09 g), Dimodan U (0.54 g) and soy bean oil (0.27 g) were placed into a Pyrex tube and the tube was heated in a water bath at 40° C. When the temperature of the sample reached 40° C., the tube was agitated with a vortex to homogenize the phase and then cooled down to room temperature. A solution (19 g) containing 0.73% sodium caseinate in phosphate buffer (0.2 mol/L; pH 6) was added. The dispersion was obtained using Dr. Hielscher Ultraschallprozessor 400 (setting cycle 1, amplitude 70% for about 2 minutes). The temperature of the dispersed phase was between 52° C. and 60° C. at the end of the dispersion procedure. This process produced an oil-in-water emulsion where the oil droplets have an internal structure of a water-in-oil emulsion according to WO27060177A1. After cooling down to room temperature, the samples were placed in a silicone bath at 120° C. and heated for 30 minutes. Xylose was isolated from dispersed water-in-oil emulsion as follows. After cooling down, diethyl ether (10 mL) was added to dispersed mesophase and the mixture was shaken during 45 min to disintegrate the dispersed water-in-oil microemulsion. Then the mixture was centrifuged at 4000 rpm for 20 min to separate water and organic phase. The water phase was diluted 20-times with deionized water, filtered through a PVDF filter (polyvinylidene fluoride, 0.22 μm/25 mm), and analysed by HPAEC. This is a prior art composition as taught in the cited reference.

A third Maillard flavor composition was made using the methods disclosed in WO27060177A1, also using glycine and xylose as reactants and a Maillard reaction was performed in water as reaction matrix. A solution of glycine (0.011 g, 0.14 mmol) and xylose (0.021 g, 0.14 mmol) in 10 mL of phosphate buffer (0.2 mol/L; pH 6.0) was heated in a 30 mL pyrex tube for 30 min at 120° C. After cooling down, the reaction mixture was diluted 20-times with deionized water, filtered through a PVDF filter (polyvinylidene fluoride, 0.22 μm/25 mm), and analysed by HPAEC.

The compositions each contained 0.2% xylose and 0.1% glycine by weight. All three compositions were heated to the same temperature and for the same time, i.e., at 120° C. for 30 minutes, to cause a Maillard reaction using xylose. After 30 minutes, the amount of residual xylose in the different samples was determined as a measure of the extent of the Maillard reaction. The residual xylose in the first composition was 1.5%; the residual xylose in the second composition was 75.8%; and the residual xylose in the third composition was 77.7%.

These results surprisingly show a strong increase of Maillard reactant (sugar) conversion into Maillard reaction products (98.5% of xylose degraded) in the first composition as compared to the second composition (24.2%); and the third composition (22.3%). The substantial improvement in the sugar conversion was unexpected. The present invention produces Maillard flavor compositions containing substantially more Maillard reaction products, and thus, more flavor, for a given amount of reactants.

Example 2

Method 2 was used to prepare a Maillard flavor composition using the components shown in Table 1. The structured lipid phase was heated to a temperature of 95° C. for 120 minutes. A food composition suitable for consumption by dogs was prepared in two portions, one containing the Maillard flavor composition (test), and one without the Maillard flavor composition (control). The test food composition was prepared by adding the Maillard flavor composition at 5% into a fat or oil, then this flavored fat or oil was coated externally at 8.6% based on the weight of the food composition. The control food composition was prepared without adding the Maillard flavor composition; therefore fat or oil was directly sprayed externally at 8.6% based on the weight of the food composition.

The two food compositions were fed to a dog panel consisting of 20 dogs to determine palatability using a standard two-bowl palatability feeding method. Each dog was given pre-weighed bowls of the test and control food compositions. Food compositions were presented simultaneously to the animal for no more than 20 minutes. Food composition consumption was determined for each food composition after weighing leftover food compositions. Preference for the test food composition versus the control food composition was reflected in the percentage consumption for each food composition, calculated as follows:

% test food consumption=g consumption test food composition/(g consumption test food composition+g consumption control food composition)*100

A paired t-test was used to determine if the percent consumption of the test food composition was significantly different from the control food composition ($p<0.05$). The results of the trial showed that the dogs significantly preferred ($p<0.05$) the test food composition over the control food composition. The average percent consumption for the test food composition was 72%. The average percent consumption for the control food composition was 28%.

Example 3

Method 2 was used to prepare a Maillard flavor composition using the ingredients shown in Table 1. The structured lipid phase was heated to a temperature of 95° C. for 120 minutes. A food composition suitable for consumption by cats was prepared in two portions, one containing the Maillard flavor composition (test) and one without the Maillard flavor composition (control). The test food composition was prepared by adding the Maillard flavor composition at 5% into a fat or oil. Then this flavored fat or oil was coated externally at 8.5% based on the weight of the food composition. The control food composition was prepared without adding the Maillard flavor composition, therefore fat or oil is directly coated externally at 8.5% based on the weight of the food composition.

The preference for the test food versus the control food was assessed on twenty cat palatability trials with a total of 402 cats. Each test and control food composition was presented simultaneously to each cat for a duration of 16 hours and consumption was measured automatically via an electronic feeding system. The bowl position for the control and test food composition was counterbalanced for half of the trials, such that the test food was on the left side for 50% of the trials and on the right side for 50% of the trials. Preference for the test food composition versus the control food composition was reflected in the calculated percentage consumption for each diet, calculated as follows:

% consumption test food composition=g consumption test food composition/(g consumption test food composition+g consumption control food composition)*100

A paired t-test was used to determine if the percent consumption of the test food composition was significantly different from the control food composition ($p<0.05$). The overall preference for the combined cat trials showed that the test food composition was significantly preferred with a mean consumption of 63% versus 37% for the control food composition. ($p<0.05$).

TABLE 1

| Ingredients | % in Formula |
| --- | --- |
| Xylose | 4.26 |
| Tetrasodium Pyrophosphate | 0.60 |
| Cysteine Hydrochloride | 1.62 |
| Sodium Hydroxide (50%) | 1.13 |
| Water | 8.45 |
| Beef Tallow | 17.51 |
| Distilled Monoglycerides | 66.43 |
| Total | 100.00 |

Example 4

Method 3 was used to prepare a Maillard flavor composition using the components shown in Table 2. The structured lipid phase was heated to a temperature of 105° C. for 60 minutes. The resulting Maillard flavor composition exhibited a dark-brown coloration.

TABLE 2

| Ingredients | % in Formula |
| --- | --- |
| Glucose | 0.51 |
| Xylose | 0.86 |
| Glycine | 1.09 |
| Cysteine | 0.35 |
| Proline | 0.89 |
| Water | 9.67 |
| Chicken fat | 30.55 |
| Distilled monoglycerides | 56.08 |
| Total | 100.00 |

A control sample was prepared as follows: a mixture of glucose (3.84%), xylose (6.42%), glycine (8.13%), cysteine (2.60%), and proline (6.65%) in water (72.36%) was heated to a temperature of 105° C. for 60 minutes. This aqueous solution (10.00%) was then added to a mixture of Chicken fat (31.60%) and distilled monoglycerides (58.40%) and the resulting mixture was stirred at room temperature for 1 minute to generate a structured lipid phase. The obtained structured lipid phase, containing Maillard products reacted in water, exhibited a light-orange coloration indicating a lesser advancement of the Maillard reaction in water than in the structured lipid phase.

For sensory evaluation, the Maillard flavor composition and the control sample were diluted in Chicken fat (25:75 Maillard flavor composition or control sample:Chicken fat). On sensory evaluation, the Chicken fat flavored with the Maillard flavor composition was preferred over the Chicken fat containing the control sample because of its stronger roasted chicken flavor. The Chicken fat flavored with the Maillard flavor composition was also preferred for its well-balanced chicken flavor. The Chicken fat containing the control sample was affected by sulfury off-notes. When added to boiling water, the Maillard flavor composition provided a pleasant roasted chicken flavor (at 0.1%). In contrast, the control sample provided only faintly perceivable meaty flavor. When added to boiling water (at 0.1%) containing an appropriate amount of chicken bouillon (Maggi), the Maillard flavor composition exhausted the chicken flavor of the bouillon and gave a more roasted character, whereas the control sample did not provide any perceivable flavor changes when compared to the chicken bouillon alone.

Example 5

Yield in Key Volatiles 2-furfurylthiol (FFT) and 2-methyl-3-furanthiol (MFT) in Structured Fluid and Aqueous Phase Materials: The following materials were used D-Xylose, Biochemica Fluka (Buchs, CH); L-Cysteine, Biochemica Fluka (Buchs, CH); Dimodan U Danisco (Copenhagen, DK); Soybean oil Nutriswiss (Lyss, Switzerland); Monosodium dihydrogenphosphate, monohydrate, p.A. Merck (Dietikon, CH); and Water Milli Qa-10, Millipore (FR).

Pre-reaction in phosphate buffer: A solution of cysteine (6.46 g) and xylose (24 g) in sodium phosphate buffer (79.54 g; 0.2 mol/L; pH 5.5) was dispatched (a 5 ml) into silanised 20 mL crimp cap vials (Chromacol) and heated in a silicone bath at 95° C. At defined time intervals two vials were taken out of the silicone bath and internal standards were added (5.53 µg [2H2]-FFT in 50 µL pentane and 14.6 µg [2H3]-MFT in 50 µL pentane) into each vial. The vials were agitated with a vortex and after cooling down to room temperature they were stored over-night in a refrigerator. Next day they were analyzed by gas chromatography-mass spectrometry.

Pre-reaction in structured lipid: A solution of cysteine (1.62 g) and xylose (6.0 g) in sodium phosphate buffer (17.38 g; 0.2 mol/L; pH 5.5) was dispatched (à 0.75 g) into 20 mL crimp cap vials (Chromacol) containing Dimodan U (2.82 g) and soybean oil (1.41 g). To form mesophase, the vials were first heated in a silicone bath at 95° C. till the reaction system became liquid and then they were intensively vortexed. The vials were then heated at 95° C. for a defined period of time. During heating, the vials were agitated with a vortex every 60 minutes. At defined time intervals two vials were taken out of the silicone bath and internal standards were added (5.53 g [2H2]-FFT in 50 L pentane and 14.6 g [2H3]-MFT in 50 L pentane) into each vial. The vials were heated for another five minutes and then agitated with a vortex. After cooling down to room temperature, the vials were stored over-night in a refrigerator and analyzed by gas chromatography-mass spectrometry next day.

The quantification of MFT and FFT was performed by headspace solid phase microextraction in combination with gas chromatography coupled to mass spectrometry (HS-SPME-GC-MS). After at least 1 hour equilibration at 20° C., the fiber [polydimethylsiloxane-divinylbenzene (PDMS-DVB), film thickness=65 µm, Supelco] was exposed for 30 min at 20° C. to the headspace above the sample in the glass vial without the agitation. After sampling, the SPME fiber was placed for 5 min in the GC injector, equipped with a 0.75 mm i.d. liner (Supelco), and heated at 250° C. GC-MS analysis was performed on a GC 6890A coupled to an MSD 5973N (both Agilent, Palo Alto, Calif.) equipped with a HP-PONA capillary column (Agilent): 50 m×0.20 mm, film thickness 0.50 µm. Helium was used as a carrier gas (1.0 mL/min, constant flow). The oven temperature program was as follows: 25° C. (2 min), 40° C./min to 50° C. (1 min), 6° C./min to 240° C. (10 min). The electron impact (EI) MS spectra were generated at 70 eV. The temperature of the ion source was 280° C. Quantification of MFT and FFT by isotope dilution assays IDA (5) were performed in the scan mode by measuring the molecular ions of analyte (MFT: m/z=114, FFT: m/z=114) and labeled internal standard ([2H3]-MFT: m/z=117, [2H2]-FFT: m/z=116).

Results: After 6 hours of reaction at pH=5.5, the amount of volatile in micromol/mol xylose was 9.4 for MFT in buffer, 94.7 for MFT in structured lipid, 18.9 of FFT in buffer and 139 of FFT in structured lipid phase.

Example 6

A structured lipid phase was prepared using the components shown in Table 3. Reducing sugars and amino acids were added to water and agitated until dissolved, resulting in an aqueous solution. PGPR was mixed with Palm olein, at 60° C., in a large beaker till forming an homogeneous solution. In another beaker, carrageenan was mixed with the aqueous solution also at 60° C. till complete dissolution. The lipophilic mixture formed was maintained at 60° C. and then agitated by a helix. The water solution was slowly added to the lipophilic mixture. The mixture was agitated for 20 minutes. After that, the helix was removed and a Polytron tip was used with a speed increasing from 0 to 6.5 for a total of 2 minutes.

TABLE 3

| Ingredients | % in Formula |
|---|---|
| Glucose | 3.30 |
| Rhamnose | 0.65 |
| Fructose | 3.95 |
| Cysteine | 2.00 |
| Proline | 13.15 |
| Water | 46.45 |
| Palm olein | 28.00 |
| PGPR 90 (Danisco) | 2.00 |
| Carrageenan (Shemberg) | 0.50 |
| Total | 100.00 |

The structured lipid phase was coated externally on a chilled bread dough (at 0.5% based on the weight of the food product). The coated bread dough (test food product) was then stored overnight at +4° C.

A control sample was prepared as follows: glucose (4.75%), rhamnose (0.95%), fructose (5.70%), cysteine (2.85%), and proline (18.90%) were added to water (66.85%) and agitated until dissolved, resulting in an aqueous solution. This aqueous solution was then coated externally on a chilled bread dough (at 0.35% based on the weight of the food product, to ensure similar reducing sugars and amino acids levels between the control and test food products). The coated bread dough (control food product) was then stored overnight at +4° C.

For sensory evaluation, the test food product and the control food product were heated in a microwave oven (1 min 30 s, 750 W). The aroma perceived in the room during microwave heating and the flavor of the microwave heated food products were evaluated by a selected panel. The panel found the aroma and flavor from the control food product to be almost indistinguishable from those of a non-coated chilled bread dough (yeast-leavened bread aroma/flavor), whereas the test food product gave a rich, freshly baked bread aroma/flavor impression.

Example 7

A structured lipid phase was prepared using the components shown in Table 4. Reducing sugars and amino acids were added to water and agitated until dissolved, resulting in an aqueous solution. Without adjusting the pH, the aqueous solution was mixed with fat or oil and lipophilic additives. Rapseed oil and Dimodan U were mixed together at 60° C. till obtaining an homogeneous solution. The resulting mixture was heated at 60° C. and mixed with a Vortex till obtaining an homogeneous mixture.

TABLE 4

| Ingredients | % in Formula |
|---|---|
| Glucose | 0.47 |
| Rhamnose | 0.09 |
| Fructose | 0.57 |
| Cysteine | 0.29 |
| Proline | 1.89 |
| Water | 6.69 |
| Rapeseed oil | 30.00 |
| Distilled monoglycerides | 60.00 |
| Total | 100.00 |

The structured lipid phase was coated externally on a chilled bread dough (at 1.5% based on the weight of the food product). The coated bread dough (test food product) was then stored overnight at +4° C.

A control sample was prepared as follows: glucose (4.75%), rhamnose (0.95%), fructose (5.70%), cysteine (2.85%) and proline (18.90%) were added to water (66.85%) and agitated until dissolved, resulting in an aqueous solution. This aqueous solution was then coated externally on a chilled bread dough (at 0.15% based on the weight of the food product, to ensure similar reducing sugars and amino acids levels between the control and test food products). The coated bread dough (control food product) was then stored overnight at +4° C.

For sensory evaluation, the test food product and the control food product were heated in a microwave oven (1 min 30 s, 750 W). The aroma perceived in the room during microwave heating and the flavor of the microwave heated food products were evaluated by a selected panel. The panel found the aroma and flavor from the control food product to be almost indistinguishable from those of a non-coated chilled bread dough (yeast-leavened bread aroma/flavor), whereas the test food product gave a rich, freshly baked bread aroma/flavor impression.

Example 8

A structured lipid phase was prepared using the components shown in Table 5. Reducing sugars and amino acids were added to water and agitated until dissolved, resulting in an aqueous solution. Dimodan U was mixed with Palm olein, at 60° C., in a large beaker till forming an homogeneous solution. In another baker, the aqueous solution was heated till 60° C. The lipophilic mixture formed was maintained heated at 60° C. and then was agitated by a helix. The water solution was slowly added to the lipophilic mixture. Agitation was left for a total of 20 minutes. After that, the helix was removed and a Polytron tip was used with a speed increasing from 0 to 6.5 for a total of 2 minutes.

TABLE 5

| Ingredients | % in Formula |
| --- | --- |
| Glucose | 2.37 |
| Rhamnose | 0.47 |
| Fructose | 2.84 |
| Cysteine | 1.44 |
| Proline | 9.46 |
| Water | 33.42 |
| Palm olein | 42.00 |
| Distilled monoglycerides | 8.00 |
| Total | 100.00 |

The structured lipid phase was coated externally on a chilled bread dough (at 0.7% based on the weight of the food product). The coated bread dough (test food product) was then stored overnight at +4° C.

A control sample was prepared as follows: glucose (4.75%), rhamnose (0.95%), fructose (5.70%), cysteine (2.85%) and proline (18.90%) were added to water (66.85%) and agitated until dissolved, resulting in an aqueous solution. This aqueous solution was then coated externally on a chilled bread dough (at 0.35% based on the weight of the food product, to ensure similar reducing sugars and amino acids levels between the control and test food products). The coated bread dough (control food product) was then stored overnight at +4° C.

For sensory evaluation, the test food product and the control food product were heated in a microwave oven (1 min 30 s, 750 W). The aroma perceived in the room during microwave heating and the flavor of the microwave heated food products were evaluated by a selected panel. The panel found the aroma and flavor from the control food product to be almost indistinguishable from those of a non-coated chilled bread dough (yeast-leavened bread aroma/flavor), whereas the test food product gave a rich, freshly baked bread aroma/flavor impression.

In the specification, there have been disclosed typical preferred embodiments of the invention and, although specific terms are employed, they are used in a generic and descriptive sense only and not for purposes of limitation, the scope of the invention being set forth in the claims. Obviously many modifications and variations of the invention are possible in light of the above teachings. It is therefore to be understood that within the scope of the appended claims the invention may be practiced otherwise than as specifically described.

What is claimed is:

1. A Maillard flavor composition comprising a structured lipid phase comprising a lipid and an optional emulsifier, in which is disposed Maillard reaction reactants and Maillard reaction products, wherein the structured lipid phase comprises a continuous lipid phase and a discontinuous aqueous phase, wherein the structured lipid phase is solid, semi-solid or liquid at room temperature and is liquid at about 40° C., produced by a process comprising:
   a. making the structured lipid phase comprising the continuous lipid phase comprising the lipid, and a dispersed aqueous phase comprising an aqueous solvent, wherein the aqueous phase contains at least a first Maillard reactant having a free carbonyl group, and a second Maillard reactant having an amino group available for reaction with the free carbonyl on the first reactant; and
   b. incubating the structured lipid phase under conditions of time and temperature sufficient for a Maillard reaction to occur between the first and second reactants, such that at least one Maillard reaction product is formed;
   wherein the process provides a conversion of at least 50% of the Maillard reaction reactants.

2. The composition of claim 1 wherein the structured lipid phase comprises an emulsifier and comprises from about 0.3% to about 95% aqueous solvent and from about 5% to about 99.7% lipid plus emulsifier, wherein the lipid comprises a comestible oil or fat.

3. The composition of claim 2 wherein the emulsifier comprises a saturated or unsaturated monoglyceride.

4. The composition of claim 1 further comprising at least one catalyst of a Maillard reaction.

5. The composition of claim 1 further comprising at least one palatability enhancer other than the Maillard reaction products.

* * * * *